March 30, 1948.　　　H. B. FUGE　　　2,438,872
DYNAMOELECTRIC MACHINE
Filed Nov. 14, 1944　　　3 Sheets-Sheet 1

Inventor
Harry B. Fuge
By
William P. Stewart
Attorney

Witness:
Godfrey Vecina

March 30, 1948.    H. B. FUGE    2,438,872
DYNAMOELECTRIC MACHINE
Filed Nov. 14, 1944    3 Sheets-Sheet 3

Inventor
Harry B. Fuge
By William F. Stewart
Attorney

Witness:
Godfrey Pecino

Patented Mar. 30, 1948

2,438,872

UNITED STATES PATENT OFFICE 2,438,872

DYNAMOELECTRIC MACHINE

Harry B. Fuge, Somerville, N. J., assignor to The Singer Manufacturing Company, Elizabeth, N. J., a corporation of New Jersey Application November 14, 1944, Serial No. 563,380

2 Claims. (Cl. 171—252)

This invention relates to dynamoelectric machines and particularly to motors of the low-inertia type adapted for use as the driving units of "follow-up" and similar control systems.

In such control systems, it is generally desirable and necessary that the output motion be made to follow quickly and accurately the variations of the input motion. It has been found that motors having a high ratio of output torque to rotor inertia give the best follow-up performance because of their inherently high acceleration and deceleration.

Conventional general-purpose induction motors of ¼ horsepower rating at 1725 R. P. M. have a torque-to-inertia ratio of approximately 2.5, where the torque is expressed in ounce-inches and the inertia in ounce-inches squared. On the basis of the same rating, a low-inertia motor built according to the present invention has a torque-to-inertia ratio many times that of the conventional motor.

Attempts have been heretofore made to improve the torque-to-inertia ratio by simply reducing the rotor diameter, but such attempts have had little success because the reduced rotor diameter also has made necessary a reduction in the torque for the same temperature rise with the result that little, if any, net change in the torque-to-inertia ratio has been effected. Further attempts to gain more favorable ratios by increasing the core stacking length have been unsuccessful, mainly because of resulting overheating.

By employing special ventilating devices, together with certain unusual optimum design ratios, I have succeeded in constructing electric motors having ratios of torque-to-inertia, of as much as 30.5, or more than twelve times greater than those of equally rated motors designed and built along conventional lines.

It is an object of this invention, therefore, to provide an electric motor having a ratio of torque-to-inertia many times greater than that of a general-purpose motor of equal speed and rating, and of conventional design.

A further object of this invention is to provide an improved ventilating system for dynamoelectric machines of the low-inertia type.

Another object of this invention is to establish a criterion for proportioning certain constructional elements of practical electric motors to produce unusually large values of the ratio of torque-to-inertia.

With the above and other objects in view, as will hereinafter appear, the invention comprises the combinations and arrangements of parts hereinafter set forth and illustrated in the accompanying drawings of certain specific embodiments of the invention, from which the several features of the invention and the advantages attained thereby will be readily understood by those skilled in the art.

Figure 1:
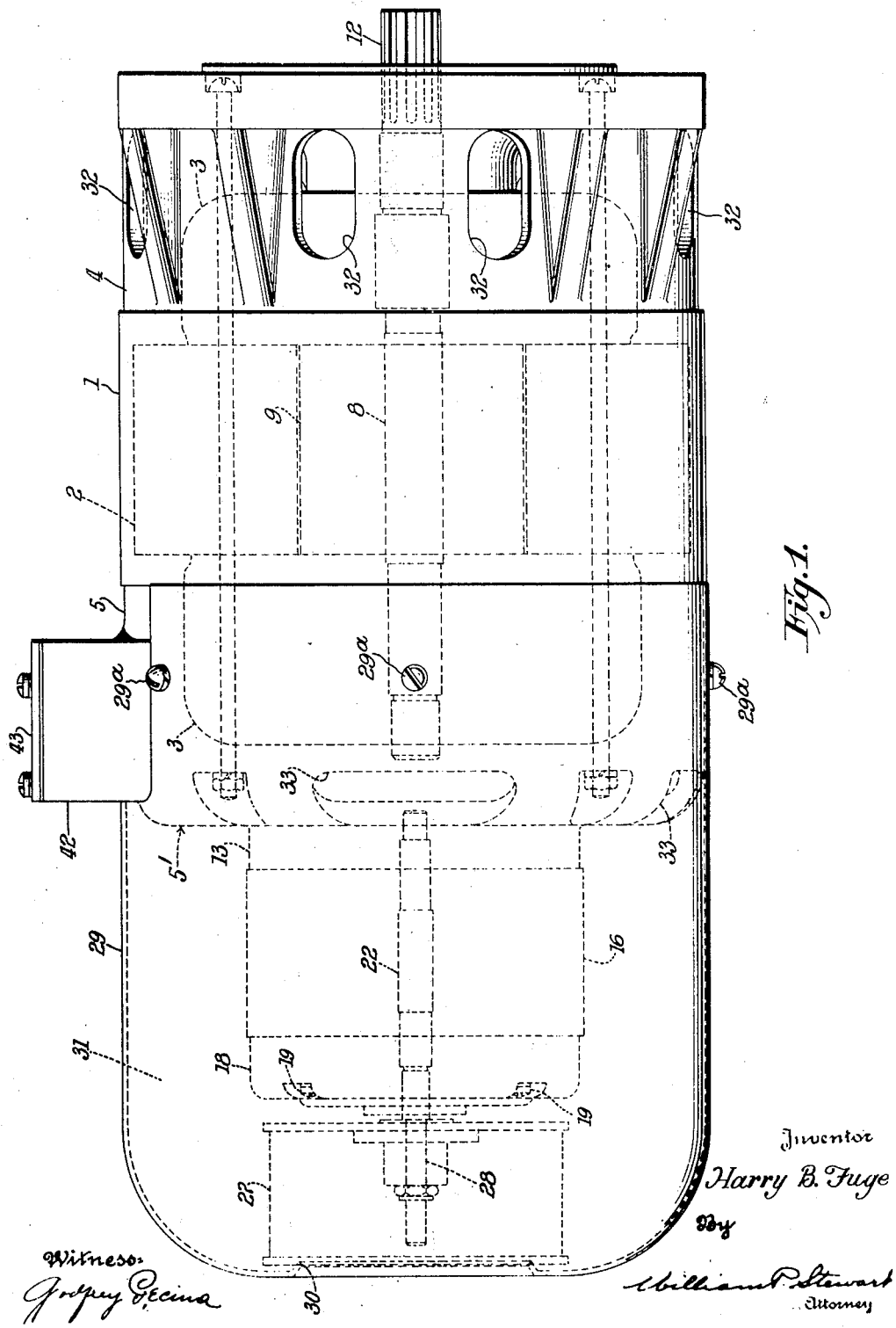
Fig. 1 is a longitudinal elevational view of an electric motor embodying the invention.
Figure 2:
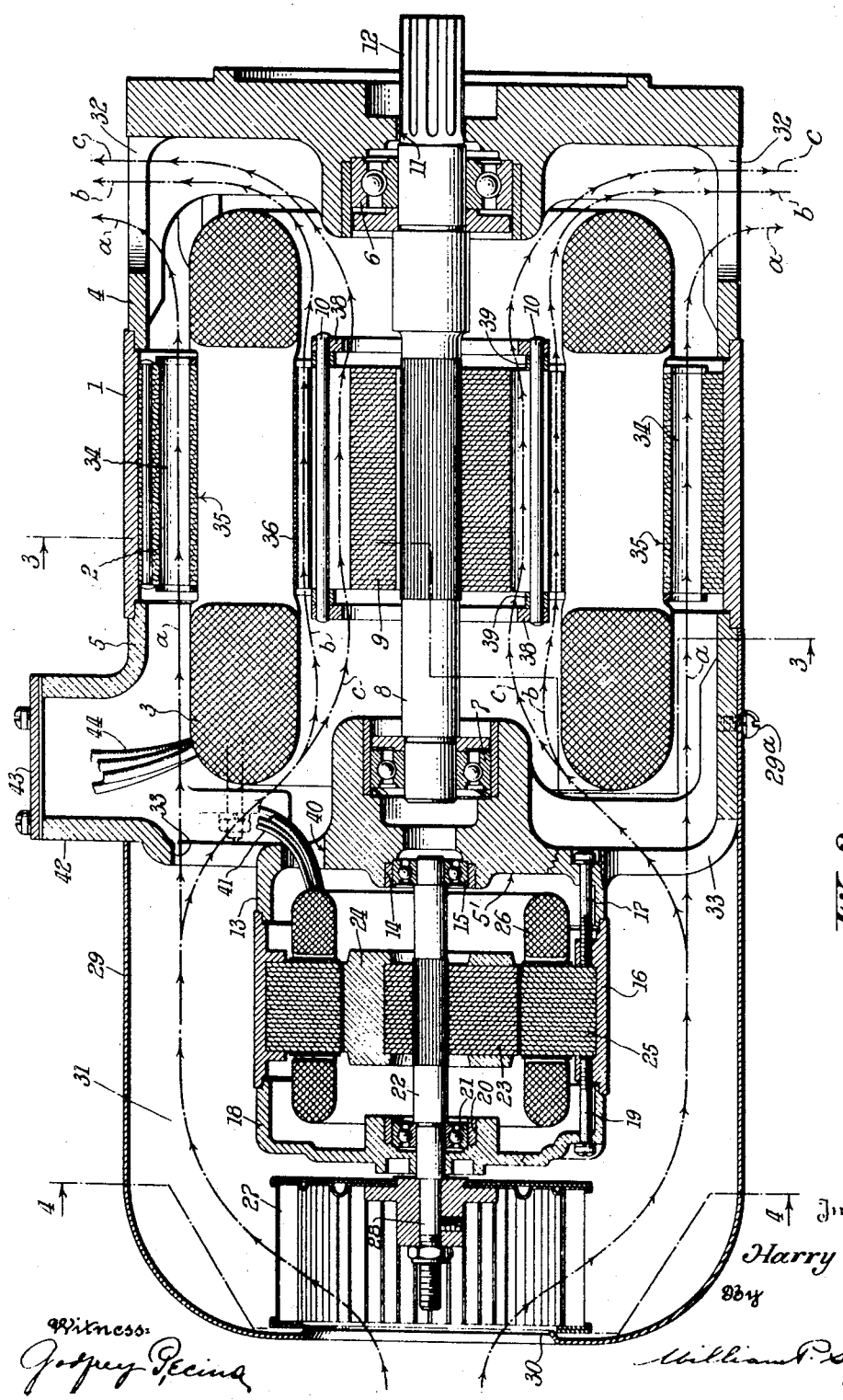
Fig. 2 is a longitudinal sectional view of the same electric motor.

Referring more specifically to Figs. 1 and 2, there is shown a dynamoelectric machine comprising a cylindrical frame member 1, in which is suitably secured a laminated stator core member 2 provided with a current-carrying winding 3. End-bonnets or end-covers 4 and 5 are secured to said frame member and carry bearings 6 and 7, respectively, in which is journaled a shaft 8 carrying a rotor core 9 and squirrel-cage winding 10. Said stator and rotor elements constitute a main electric motor.

The shaft 8 extends through an apertured portion 11 of the end-bonnet 4 and terminates in an exterior splined portion 12 adapted for connection of suitable loads to said motor.

At the opposite end of the frame, the end-bonnet 5 has an end-wall 5' provided with an outwardly extending annular flange 13 and with a central apertured portion 14 affording a seat for a bearing 15. A frame member 16 is secured upon the flange 13 by means of bolts 17 extending through the wall 5' of said end-bonnet 5 and threaded into said frame. A closure end-bonnet 18 is secured to said frame member 16 by means of bolts 19 and is apertured to provide a seat 20 for a bearing 21. A shaft 22 is disposed in axial alinement with the shaft 8 and is rotatably journaled in bearings 21 and 15; said shaft 22 carrying a laminated rotor core 23 provided with a squirrel-cage winding 24. A complemental laminated stator core 25 and associated winding 26 are carried by said frame 16 and constitute, with said rotor elements, an auxiliary electric motor. It will be understood from the foregoing description that one end-bonnet of the auxiliary motor comprises in part a portion of the end wall 5' of the main motor.

Figure 4:
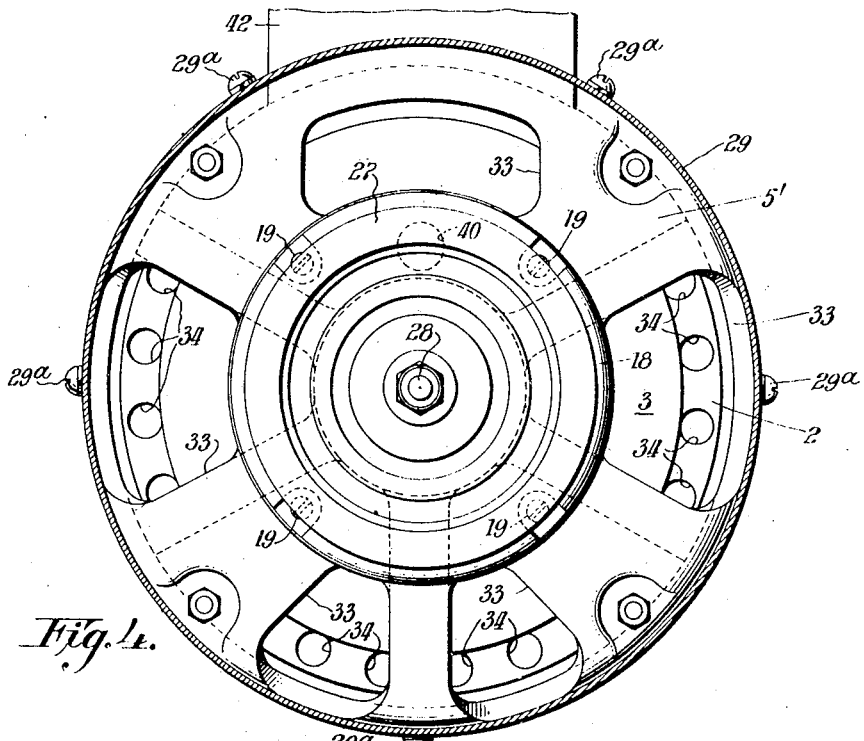
Fig. 4 is a partial vertical sectional view taken on the line 4—4 of Fig. 2.
Figure 3:
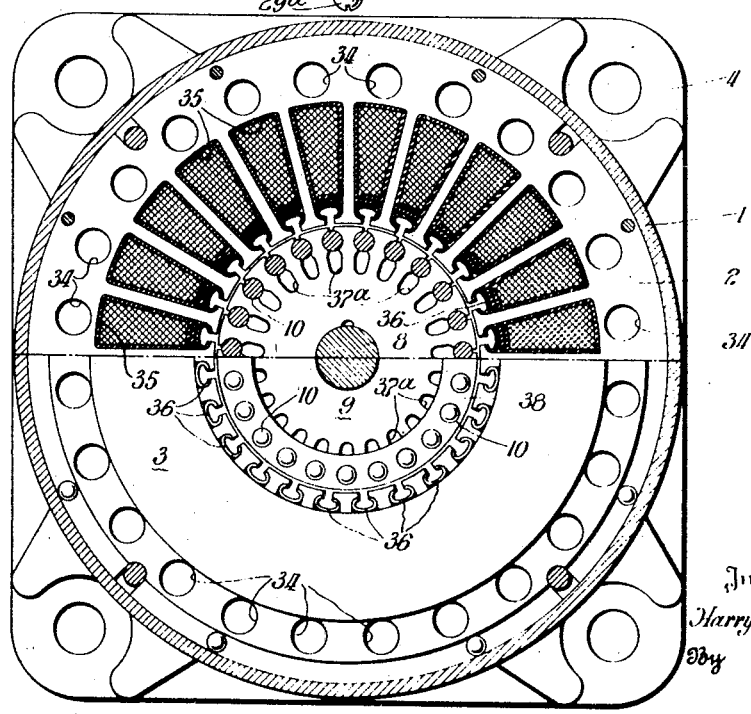
Fig. 3 is a transverse sectional view taken on the line 3—3 of Fig. 2.

A centrifugal fan rotor 27, sometimes referred to as of the "Sirocco" type, is secured upon an extended portion 28 of shaft 22 for rotation therewith and at the side of the auxiliary motor opposite the main electric motor. A guard or end-cover 29 is adapted to embrace the cylindrical peripheral portion of the end-bonnet 5, to which it is secured by screws 29ᵃ. This guard cover 29 houses the auxiliary motor and is formed in the end wall thereof adjacent the fan rotor 27 with a single circular apertured portion 30 having an inturned edge and providing an inlet orifice for entrance of air axially into the fan rotor 27. It is to be noted that the guard cover 29 forms, with the auxiliary motor elements 13, 16 and 18, a fan chamber 31 for directing and distributing the air delivered by the fan 27. The end-bonnet 4 is circumferentially formed with a plurality of radial apertures 32, Figs. 1 and 2, in the cylindrical wall portion to provide discharge orifices for the motor ventilating air. The wall 5' of the end-bonnet 5 is formed with a plurality of inlet apertures 33, as illustrated in Figs. 2 and 4. These apertures 33 therefore provide air-communication means between the fan chamber 31 and the interior of the main motor housing. An aperture 40 formed in the wall 5' of the end-bonnet 5 provides a conduit through which are passed the leads 41 from the auxiliary motor. The end-bonnet 5 is also formed with a dome portion 42 carrying a cap-plate 43 which provides a terminal support to which leads 44 from the main motor and the leads 41 from the auxiliary motor may be secured for connection with external circuits (not shown).

It will be noted that the auxiliary motor and fan provide means independent of the main motor for supplying ventilating air to said main motor. This independent fan arrangement is preferable and often necessary because motors of the type illustrated in this invention may often be used in control circuits which have considerable power input to the motor, with consequential heating thereof, under standstill conditions. The customary fan mounted on the main motor shaft would, of course, have no ventilating value whatever under standstill conditions.

There has been described above a dynamoelectric machine comprising a main motor, an auxiliary motor coaxially associated with said main motor, a fan driven by said auxiliary motor and a fan guard-cover providing a fan chamber for properly directing a flow of air through the machine.

The stator core member 2 of the main motor is provided with ventilating ducts 34 extending substantially parallel to the rotor shaft 8 and entirely through the core-member 2. These ventilating ducts 34 are disposed radially outwardly and in proximity to the bottoms of stator winding slots 35; one duct 34 being preferably associated with each winding-slot 35. The winding-slots 35 are unusually deep and provide for employment of a substantially larger amount of copper than is dictated by conventional design practice.

In accordance with the present main motor construction, the stator-slots are provided with longitudinally hollow wedges 36 of segmentally tubular form and open at the radially inner portion of the stator. These hollow wedges 36 provide an enlarged air-gap area and supplement the ventilating duct 34 in passing heat-dissipating air through the stator.

The rotor-core 9 is provided with conductor-receiving slots 37 having radially outer and inner portions connected by a narrow neck. The conductors 10 of the rotor squirrel-cage winding are disposed in the radially outer portions of the slots 37 and the radially inner portions of said slots are left open to provide for circulating ventilating air through the laminations of the rotor directly in the area of the conductor 10, thereby effectively to cool said elements.

The end-rings 38 of the squirrel-cage winding 10 are spaced axially away from the ends of the rotor core 9 by means of relatively narrower spacers 39, thereby leaving the ends of the rotor slots 37 open to admit and discharge ventilating air through said slots.

The winding-slots 35, of the stator and the slots 37, of the rotor have radial openings extending into the usual air-gap to provide a maximum of allowable axial ventilating duct area through the machine. It will be noted that the bare rotor conductors 10 are radially exposed on top to the cooling action of the air traversing the air-gap and on the bottom to that of the air flowing through the unfilled portions 37ᵃ of the rotor slots. This novel application of top and bottom cooling to the rotor conductors of an induction motor is of special importance where, as in the present invention, the rotor winding, due to the necessarily restricted space provided for it, is the seat of considerable heat generation.

By referring to Fig. 2 of the drawings, it will be noted that by means of the above described construction there are provided three separate ventilating paths through the main motor. These have been designated by the arrowed lines $a$, $b$ and $c$ in Fig. 2 and they all start with the body of air in the fan chamber 31 brought in through the apertured portion 30 by the fan 27. The path $a$ comprises the ventilating holes 34 behind the stator slots and the air passing through said slots is in good thermal contact with the laminations of the stator core from which excessive heat is thereby removed. The ventilating air which traverses the path $b$ removes heat at the necessary rapid rate from the stator and rotor by reason of the increased volume rate of air flow provided by the increased air gap area due to the hollow construction of the wedges 36. Rotor heat, particularly that associated with the squirrel-cage winding 10, is effectively removed by the air which circulates in path $c$, as shown, through the unfilled portions 37ᵃ of the rotor slots 37 and is in good thermal contact with said winding 10.

The constructions described above provide a greatly increased area for axial flow of ventilating air through the machine, and particularly in the vicinity of the rotor winding. This is of the utmost importance in the field of low-inertia motors where the rotor cooling problem is made unusually difficult by the fact that the rotor diameters are necessarily small per unit of output.

A further essential and important constructional feature of the present invention relates to the ratio of the rotor core diameter to the stator core outside diameter. In the case of general-purpose electric motors, this ratio has been customarily held between .50 and .70 for good design practice, depending somewhat on the number of poles employed. It has been found that, in general, motors built with the above diametrical ratios do not have sufficiently large torque-to-inertia ratios for satisfactory use in modern automatic control applications. Instead of following conventional design procedure, new optimum ratios are established in accordance with the present invention, in order to meet the new requirement of large ratios of torque-to-inertia. According to this invention, the optimum ratio of the rotor core diameter to the stator core outside diameter is between .30 and .45, which range of values has been found to produce motors having desirably large values for the torque-to-inertia ratio. Motors built in accordance with diameter ratios less than those indicated above as desirable are impractically large and heavy. On the other hand, motors having diameter ratios greater than those herein indicated as desirable do not provide sufficient area for adequate stator conductors and thus fail to produce the necessary torque as compared with the rotor inertia.

In regard to the consideration of optimum diameter ratios expressed above, it is to be understood that these ratios are not necessarily productive of motors having maximum or even high efficiencies, nor do they necessarily produce motors in which the output per pound of material is large. The very desirable result which has been attained by this invention is the production of practical electric motors having very large torque-to-inertia ratios as compared with those of available general-purpose motors. These ratios are sufficiently large to provide the fast and accurate response demanded by present-day successful control systems. This factor is, in itself, sufficiently important in its relation to the field of automatic control to demand the development of a special line of low-inertia motors of which the present invention is representative.

Having thus set forth the nature of the invention, what I claim herein is:

1. An induction motor comprising a stator core, a rotor core having a diameter less than 45% of the outside diameter of said stator core, a first end-cover having radial apertures, a second end-cover having end apertures, a frame member located between and forming with said end-covers a housing for said cores, a second frame member mounted on said second end-cover, an auxiliary motor supported by said second frame member, a fan driven by said auxiliary motor, a fan guard formed with an end aperture and mounted on said second end-cover to enclose said fan and auxiliary motor and to form a fan chamber, and ventilating ducts extending axially through said stator and rotor cores and connecting said fan chamber with the radial apertures in said first end-cover.

2. An induction motor comprising a main motor having a stator core and a rotor core, winding-slots in said stator core, ventilating ducts extending axially through said stator and rotor cores, hollow wedges positioned in said stator slots providing additional ventilating ducts, an auxiliary motor located externally of said main motor, a fan driven by said auxiliary motor, an end-cover formed with a central aperture and secured to said main motor to form a chamber for said fan, another end-cover formed with radial apertures and located at the opposite end of said stator core from said first named end-cover, said fan being positioned to draw air into said fan chamber through said central aperture, to force said air through said ventilating ducts and to discharge it through the radial apertures of said second end-cover, the maximum ratio of said rotor core diameter to the outside diameter of said stator core being 0.45.

HARRY B. FUGE.

REFERENCES CITED

The following references are of record in the file of this patent:

UNITED STATES PATENTS

| Number | Name | Date |
| --- | --- | --- |
| 516,794 | Bell | Mar. 20, 1894 |
| 941,181 | Young | Nov. 23, 1909 |
| 1,017,257 | Frankenfield | Feb. 13, 1912 |
| 1,227,414 | Field | May 22, 1917 |
| 1,279,810 | Williamson | Sept. 24, 1918 |
| 1,555,065 | Lindquist | Sept. 29, 1925 |
| 1,692,371 | Froesch | Nov. 20, 1928 |
| 1,808,845 | Gifford | June 9, 1931 |
| 1,996,460 | Coates | Apr. 2, 1935 |
| 2,185,740 | Smith | Jan. 2, 1940 |

FOREIGN PATENTS

| Number | Country | Date |
| --- | --- | --- |
| 18,907 | Great Britain | 1913 |
| 21,129 | Great Britain | 1906 |